(12) United States Patent  
Sasaki et al.

(10) Patent No.: US 7,364,107 B2  
(45) Date of Patent: Apr. 29, 2008

(54) TAPE CARTRIDGE

(75) Inventors: Morimasa Sasaki, Tokyo (JP); Takateru Satoh, Tokyo (JP); Chotaro Kouzu, Tokyo (JP)

(73) Assignee: TDK Corporation, Tokyo (JP)

( * ) Notice: Subject to any disclaimer, the term of this patent is extended or adjusted under 35 U.S.C. 154(b) by 352 days.

(21) Appl. No.: 11/071,594

(22) Filed: Mar. 2, 2005

(65) Prior Publication Data

US 2005/0258291 A1   Nov. 24, 2005

(30) Foreign Application Priority Data

Mar. 3, 2004  (JP)  ............... 2004-058890  
Mar. 11, 2004 (JP)  ............... 2004-068622

(51) Int. Cl.  
*G11B 23/107* (2006.01)

(52) U.S. Cl. ...................... 242/348; 360/132

(58) Field of Classification Search ................ 242/348, 242/348.2; 360/132  
See application file for complete search history.

(56) References Cited

FOREIGN PATENT DOCUMENTS

| JP | 11-185437 A | 7/1999 |
| JP | 2002-343058 A | 11/2002 |
| JP | 2004-265521 A | 9/2004 |

OTHER PUBLICATIONS

Patent Abstracts of Japan for JP2004-265521 published Sep. 24, 2004.  
Patent Abstracts of Japan for JP2002-343058 published Nov. 29, 2002.  
Patent Abstracts of Japan for JP11-185437 published Jul. 7, 1999.

*Primary Examiner*—John Q. Nguyen  
(74) *Attorney, Agent, or Firm*—Darby & Darby P.C.

(57) ABSTRACT

A tape cartridge capable of preventing emission of vibrating sounds and occurrence of abrasion at a usage time when a reel hub unit rotates at a high rotating speed. The tape cartridge has a single reel hub unit rotatably accommodated in a case and having its periphery wound with a tape-shaped recording medium, a brake lock member including an engaging portion for engaging a reel hub unit to restrict rotation of the reel hub unit when in non-use, and a flat surface bearing portion provided substantially at a central part of the brake lock member, wherein the central axis of said flat surface bearing portion of the brake lock member is parallel with and offset from the rotating central axis around which said brake release member rotates together with said reel hub unit.

3 Claims, 11 Drawing Sheets

TAPE CARTRIDGE

BACKGROUND OF THE INVENTION

1. Field of the Invention

The present invention relates to a tape cartridge constructed to restrict a rotation of a reel hub by a brake lock member when in non-use and to release the reel hub from locking when in use.

2. Description of the Prior Art

A 1-reel type tape cartridge has a single reel hub unit inside, and a tape-shaped recording medium is wound along the periphery of the hub. This type of tape cartridge is employed for storing backup data for a computer, and so forth. When this type of tape cartridge is loaded into a magnetic recording/reproducing apparatus for the computer, the tape-shaped recording medium wound along the hub periphery of the reel hub unit is led out and then rewound on a reel hub unit on the side of the magnetic recording/reproducing apparatus. Then, the tape-shaped recording medium runs between the reel hub units on both sides, whereby recording and reproducing are conducted.

In a conventional tape cartridge shown in FIGS. 11A through 11C as described above, when not used, prevention of slackening of the tape-shaped recording medium wound on a reel hub unit 130 rotatably accommodated in a case constructed of an upper case 120 and a lower case 220, involves restricting an unnecessary rotation of the reel hub unit 130 (refer to, e.g., Japanese Patent Application Laid-Open Publication No. 2002-343058). For attaining this, as illustrated in FIG. 11A, when not used, teeth 151 of a brake lock member 150 mesh with teeth 135 of the reel hub unit 130, thereby locking the reel hub unit 130 so as not to rotate. When used, a contact surface of a brake release member 160 contacts with a bearing portion 152 of the brake lock member 150 to raise the brake lock member 150 upward in FIG. 11B, thereby releasing the reel hub unit 130 from being locked by the brake lock member 150. Note that the brake lock member 150 has a protruded bearing portion 152 of which a front side end has substantially a curved-surface, and a surface, taking a face-to-face relationship with the curved-surface of the bearing portion 152, of the brake release member 160 is flat. Moreover, the brake lock member 150 is biased toward the brake release member 160 by an unillustrated biasing means (spring), and the brake release member 160 is structured to rotate together with the reel hub unit 130.

A further increase in storage capacity is demanded of the aforementioned tape cartridge used for storage etc of the backup data for the computer, and a tape feeding speed decreases because of an increased data transfer rate. Therefore, a rotating speed of the reel hub unit 130 rises when used. When in use, as shown in FIG. 11B, the brake release member 160 rotates with the rotations of the reel hub unit 130. In this case, the rotating brake release member 160 has the flat surface while the bearing portion 152 of the non-rotating brake lock member 150 takes the protruded shape having substantially the curved-surface. Hence, there might be a case that a central axis of the brake release member 160, which is defined as a central axis of rotation, deviates from a central axis of the bearing portion 152 of the brake lock member as a fixed portion. If deviated in an outer peripheral direction, a difference in peripheral speed occurs in a radial direction. The brake lock member 150 is influenced by this difference and receives a force to move in the outer peripheral direction. There, however, exists a biasing force given by the spring, and conversely the force acts to return to the original position. With this operation repeated, vibrations are caused to emit vibrating sounds. Further, the bearing portion 152 of the fixed brake lock member 150 receives a large frictional force of the rotation and might be thereby abraded.

Moreover, a built-in clearance is provided between the brake lock member 150 and the upper case 120 and, if the vibrations are extremely great, causes a large tilt of the brake lock member as illustrated in FIG. 1C. The result is that the teeth 151 of the brake lock member 150 butt against the teeth 135 of the reel hub unit 130, and a problem might occur, wherein the abnormal sounds are emitted and the teeth are chipped away.

SUMMARY OF THE INVENTION

It is an object of the present invention to provide a tape cartridge capable of preventing emission of abnormal sounds and chipping of a tooth in a brake lock member and preventing emission of vibrating sounds and occurrence of abrasion at a usage time when a reel hub unit rotates at a high rotating speed because of being increased in capacity or at a producing time when the reel hub unit rotates at the high rotating speed for rewinding a tape-shaped recording medium.

A tape cartridge according to a first embodiment includes a single reel hub unit rotatably accommodated in a case and having its periphery wounded with a tape-shaped recording medium, a brake lock member including an engaging portion engaging with an engaged portion of the reel hub unit to restrict a rotation of the reel hub unit when in non-use and a flat-surface-shaped bearing portion provided substantially at a central part thereof, a biasing member for biasing the brake lock member so that the engaging portion of the brake lock member engages with the engaged portion of the reel hub unit, and a brake release member for moving the brake lock member so as to release the engaging portion of the brake lock member from the engagement with the engaged portion of the reel hub unit when in use, wherein the brake release member has a protruded portion taking a curved-surface shape or a circular conic shape on the side of the bearing portion so as to contact with the bearing portion of the brake lock member.

According to the tape cartridge, the brake release member, which rotates together with the reel hub unit when used, is provided with the protruded portion taking the curved-surface shape or the circular conic shape, and the bearing portion of the non-rotating brake lock member has the flat surface. Hence, when the brake release member rotates, a tensile force acting from the center toward the outside is not applied to the brake lock member on the non-rotating side as the flat-surface like bearing portion contacts with the protruded portion, taking the curved-surface shape or the circular conic shape, of the brake release member. Therefore, even if the reel hub unit rotates at a high rotating speed when in use and in production, the brake lock member is kept stable with neither a shift nor a tilt. Hence, it is possible to prevent emission of the vibrating sounds and occurrence of abrasion in the brake lock member. It is also possible to prevent a contact between the engaging portion of the brake lock member and the engaged portion on the side of the reel hub unit and the emission of abnormal sounds and chipping when in use and in production.

In the tape cartridge, a measure against abrasion can be taken by disposing a sheet member made from a metallic material etc. on the bearing portion of the brake lock member or on the brake release member.

A tape cartridge according to a second embodiment includes a single reel hub unit rotatably accommodated in a case and having its periphery wounded with a tape-shaped recording medium, a brake lock member including an engaging portion engaging with an engaged portion of the reel hub unit to restrict a rotation of the reel hub unit when in non-use and a protruded bearing portion provided substantially at a central part thereof, a brake release member for moving the brake lock member so as to release the engaging portion of the brake lock member from the engagement with the engaged portion of the reel hub unit when in use, and a biasing member for biasing the brake lock member so that the protruded bearing portion of the brake lock member contacts with a contact surface of the brake release member, wherein the brake lock member is provided so that a central axis of the bearing portion deviates from the rotating central axis around which the brake release member rotates together with the reel hub unit.

According to the tape cartridge, the central axis of the bearing portion deviates from the rotating central axis of the brake release member, and hence a force acting to move toward the outside from the central axis of the bearing portion is applied to the brake lock member on the non-rotating side. On the other hand, there is the force acting to return with the biasing force by the biasing member, and consequently both of these forces are kept in balance. With this operation, even if the reel hub unit rotates at the high rotating speed when in use and in production, the brake lock member is kept stable with neither the shift nor the tilt. Hence, it is possible to prevent the contact between the engaging portion of the brake lock member and the engaged portion on the side of the reel hub unit and the emission of abnormal sounds and chipping when in use and in production. It is also possible to prevent the emission of the vibrating sounds and the occurrence of abrasion in the brake lock member.

In the tape cartridge, the central axis of the bearing portion is set substantially parallel with the rotating central axis of the brake release member. Further, a deviation quantity of the central axis of the bearing portion from the rotating axis of the brake release member is set to preferably 0.1 mm through 1.5 mm, and more preferably 0.2 mm through 1.5 mm. If the deviation quantity is equal to or larger than 0.1 mm and preferably equal to or larger than 0.2 mm, none of the vibrating sounds such as chattering sounds are emitted even at the high rotating speed. Further, if equal to or lower than 1.5 mm, the abrasion is hard to occur on the contact surface of the bearing portion even when the peripheral speed increases due to the high rotating speed.

Moreover, it is preferable that the protruded bearing portion has a curved surface portion provided about the central axis and contacting with the contact surface, and a radius of the curved-surface portion is set within the range of 10 mm through 30 mm. With this contrivance, it is feasible to restrain the tilt of the brake lock member through the built-in clearance between the case and the brake lock member. It is therefore possible to stabilize the brake lock member with the bearing portion. This contrivance also makes it possible to surely prevent the emission of the abnormal sounds and to surely prevent the emission of the vibrating sounds and the occurrence of the abrasion in the brake lock member.

BRIEF DESCRIPTION OF DRAWINGS

FIG. 11A is a principal vertical sectional view showing a state where teeth of the brake lock member mesh with teeth of the reel hub unit, and the reel hub unit is thereby locked when in non-use; FIG. 11B is a principal vertical sectional view showing a released state from locking by the brake lock member when in use; FIG. 11C is a principal vertical sectional view showing a state where the brake lock member is tilted when the reel hub unit rotates at a high speed.

DETAILED DESCRIPTION OF THE PREFERRED EMBODIMENTS

A best mode for carrying out the present invention will hereinafter be described with reference to the drawings.

First Embodiment

Figure 1:
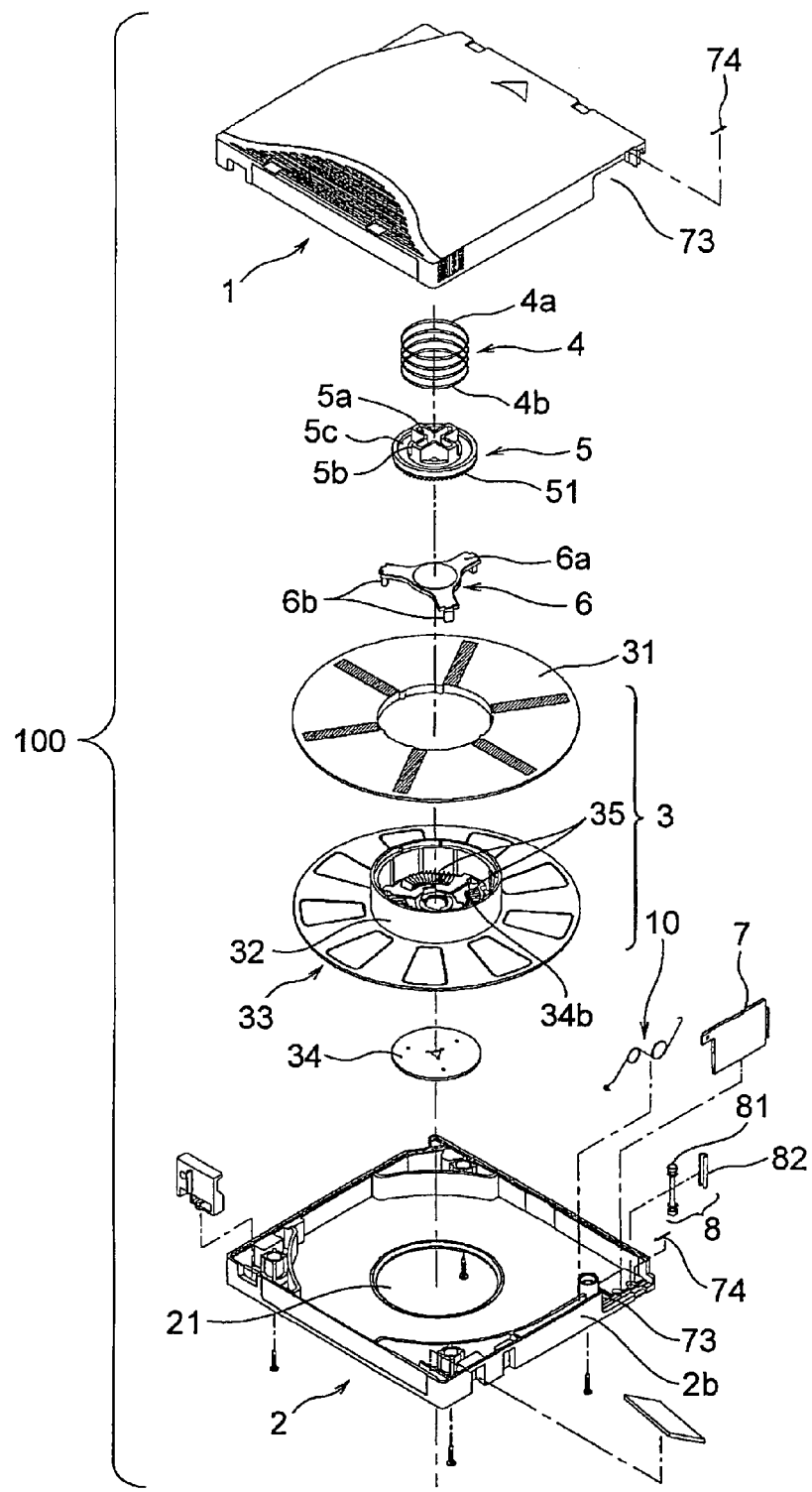
FIG. 1 is an exploded perspective view of a tape cartridge according to a first embodiment.
Figure 2:
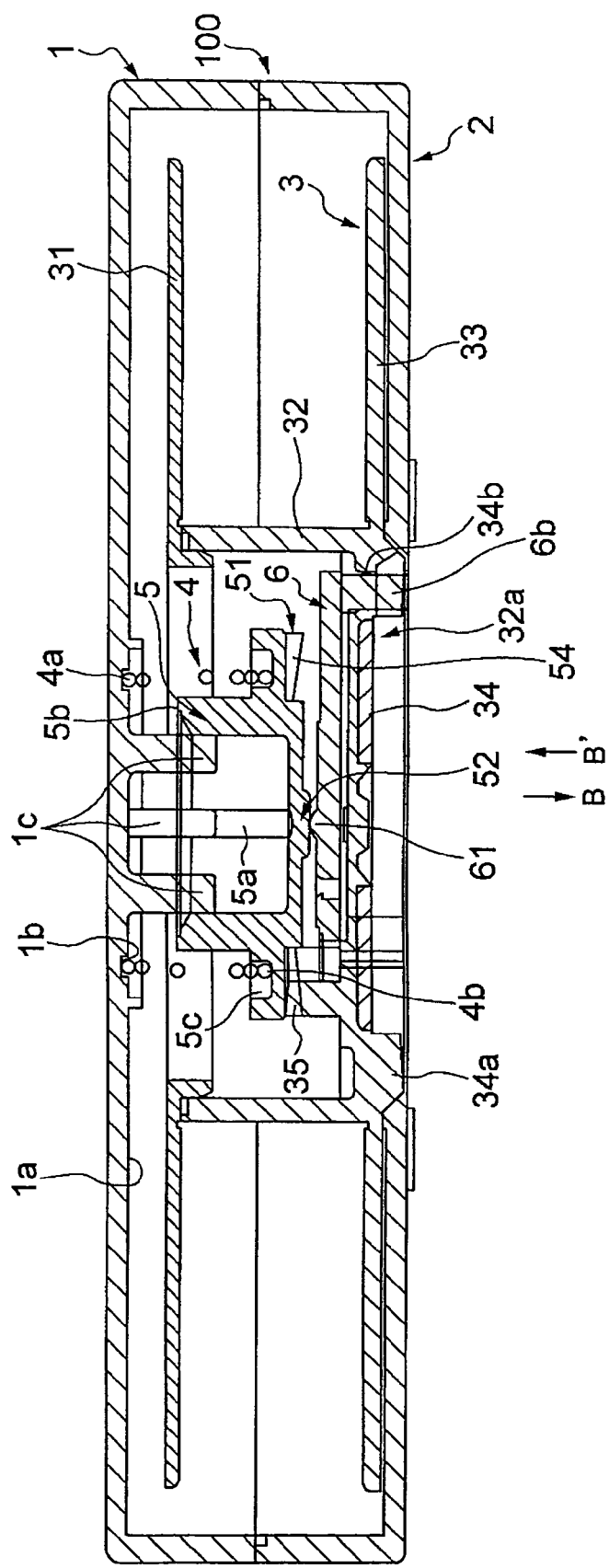
FIG. 2 is a vertical sectional view of the tape cartridge in FIG. 1, showing a state where a reel hub unit is locked in a lock position.
Figure 3:
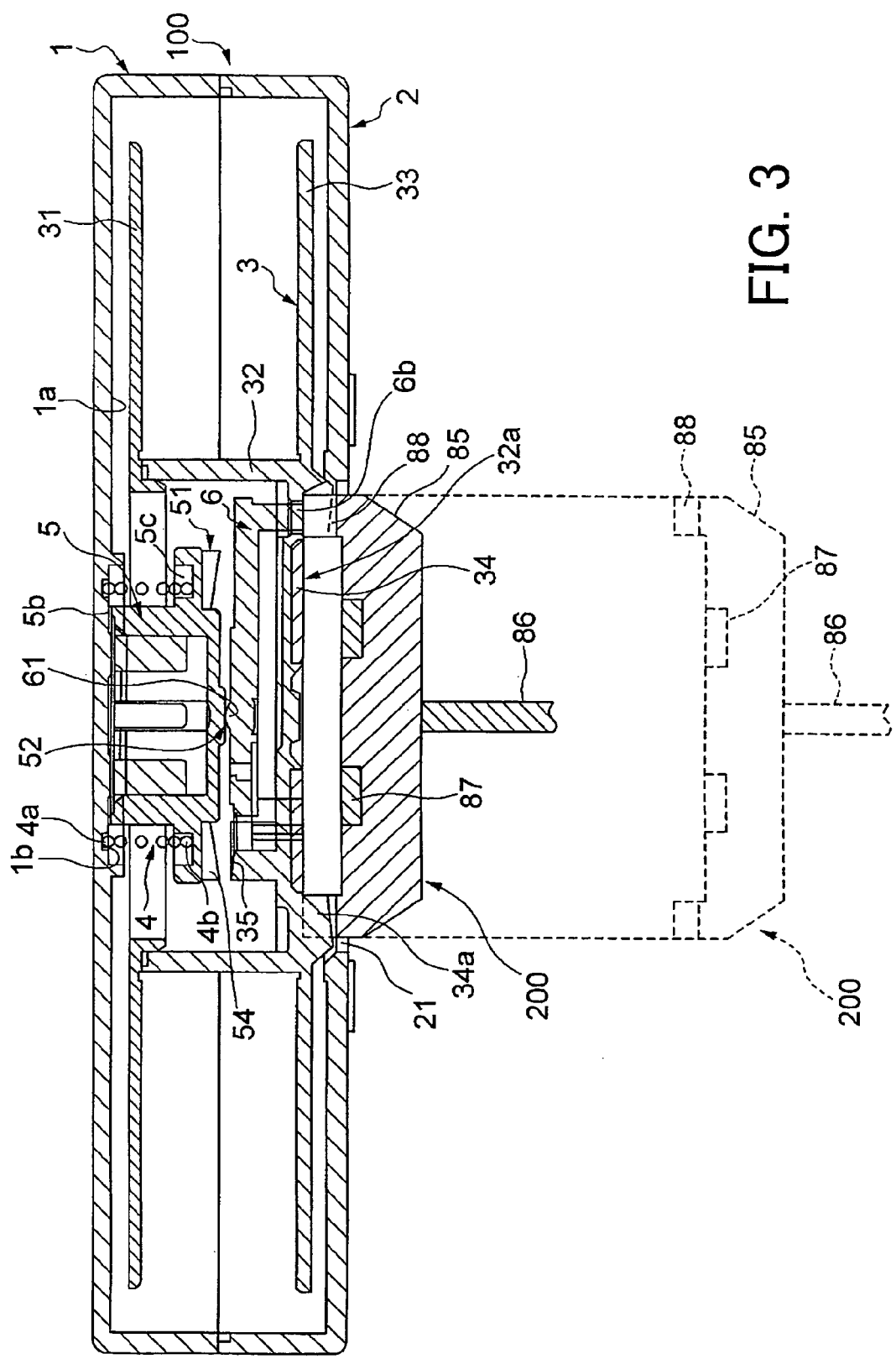
FIG. 3 is similarly a vertical sectional view of the tape cartridge in FIG. 1, showing a state where the reel hub unit is unlocked in a non-lock position.

FIG. 1 is an exploded perspective view of a tape cartridge according to a first embodiment. FIG. 2 is a vertical sectional view showing a state where a reel hub unit is locked in the tape cartridge in FIG. 1. FIG. 3 is similarly a vertical sectional view showing a state where the reel hub unit is unlocked.

A tape cartridge 100 shown in FIG. 1 is constructed as a 1-reel type tape cartridge structured of an upper case 1 and a lower case 2. The tape cartridge 100 has a configuration that a reel hub unit 3 wounded with a magnetic recording tape (which will hereinafter simply be referred to as a [tape]) defined as a tape-shaped recording medium is provided inside and becomes rotatable when loaded into a recording/reproducing apparatus. The upper case 1 and the lower case 2 are assembled together to build up a flat case taking a rectangular or substantially square shape, and can be each made from a resinous material and manufactured by molding.

The reel hub unit 3 includes an upper flange 31, a lower flange 33 and a hub 32 formed integrally with the lower flange 33 and wounded with the magnetic recording tape along its peripheral surface. Further, as shown in FIGS. 1 to 3, a circular metal plate 34 formed from a soft magnetic material is integrally provided on the side of an undersurface 32a of the hub 32. Engagement teeth 34a engaging with a toothed portion of a drive member 85 (FIG. 3) on the side of the recording/reproducing apparatus, are so provided as to be equally segmented in a circumferential direction along the periphery of the metal plate 34. A plurality of holes 34b are formed penetrating through an opposite surface to the undersurface 32a between the respective engagement teeth 34a. The metal plate 34, the engagement tooth 34a and the plurality of holes 34b are exposed to the outside via a through-hole 21 of the lower case 2.

Further, on an internal side of the hub 32 and on the opposite surface to the undersurface 32a, toothed portions 35 having a multiplicity of teeth arranged in a circular shape are so provided as to be segmented in the circumferential direction, whereby the toothed portions 35 mesh with a toothed portion 51 of a brake lock member 5. The toothed portions 35 can be formed from the resinous material such as polycarbonate (PC), etc. and manufactured by molding. In this case, however, rigidity of the toothed portion 35 may be enhanced by mixing glass fibers.

As shown in FIGS. 1 through 3, the brake lock member 5 is disposed inwardly of the hub 32. The brake lock member 5 includes the toothed portion 51 having the multiplicity of teeth arranged in the circular shape so as to mesh with the toothed portions 35 of the hub 32, a cross-shaped engagement hole 5a formed in a cylindrical end face having a diameter smaller than the toothed portion 51, an edge portion 5b formed along the periphery of the cross-shaped hole 5a, and a ring-shaped groove 5c formed to accommodate an end portion 4b of a brake lock spring 4 on the side of a back surface of the toothed portion 51. The brake lock member 5 can be made from a resinous material such as POM (polyacetal), etc. and manufactured by molding.

The brake lock member 5 is, as shown in FIGS. 1 and 2, secured to the upper case 1 in such a way that a plurality of engagement protrusions 1c provided erecting from an inner surface 1a of the upper case 1 enter the cross-shaped hole 5a and thus engage therewith so as to be movable in vertical directions in FIGS. 1 and 2. The brake lock spring 4 is constructed so that its front end 4a is fitted into a ring-shaped groove 1b of the inner surface 1a of the upper case 1. The brake lock spring 4 is positioned between the ring-shaped groove 1b of the upper case 1 and the ring-shaped groove 5c of the brake lock member 5, biases the brake lock member 5 in a direction B in FIG. 2 at all times with the result that the toothed portion 51 meshes and engages with the toothed portions 35 of the hub 32 to prevent the reel hub unit 3 from rotating, thus attaining a braking state.

A brake release member 6 is disposed between the hub 32 and the brake lock member 5, and includes a main plate 6a and a plurality of leg portions 6b protruding downward in the Figure from a plurality of positions along the periphery of the main plate 6a. The plurality of leg portions 6b are inserted into a plurality of holes 34b formed in the undersurface of the hub 32. When the tape cartridge is loaded into the recording/reproducing apparatus, the leg portions 6b of the brake release member 6 are pushed from under in the Figure and raised upward. With this operation, as shown in FIG. 3, the brake lock member 5 is raised upward resisting the biasing force of the brake lock spring 4 at a central bearing portion 52 through the brake release member 6, and moves to a non-lock position so that the edge portion 5b approaches the inner surface 1a.

Further, a leading end of the magnetic recording tape (unillustrated) wound on the reel hub unit 3 is fixed to a leader member 8. In the leader member 8, the leading end of the magnetic recording tape is wound on a pin member 81, and a clamp member 82 is fitted thereon, thereby fixing the tape leading end. When the tape cartridge is loaded into the recording/reproducing apparatus, the leader member 8 is engaged with and is held by a holding member on the side of the apparatus, whereby the tape is led into the apparatus via a tape leading aperture 73 (FIG. 1).

Further, the tape leading aperture 73 is opened and closed by a door member 7. The door member 7 is always biased by a spring member 10 in such a direction as to close the tape leading aperture 73. The door member 7 is, when loaded into the recording/reproducing apparatus, opened by an opening member (unillustrated) on the apparatus side while resisting the biasing force of the spring member 10.

In the tape cartridge shown in FIGS. 1 through 3, when unused such as being stored, etc., the brake lock member 5 is biased by the brake lock spring 4 and is moved to the lock position as shown in FIG. 2. Then, respective teeth 54 of the toothed portion 51 of the brake lock member 5 mesh and engage with the respective teeth of the toothed portions 35 of the hub 32 of the reel hub unit 3 with the result that the reel hub unit 3 gets into the braking state and therefore gets unable to rotate, thereby preventing an unnecessary rotation and making it possible to prevent the magnetic recording tape from slackening.

Figure 4:
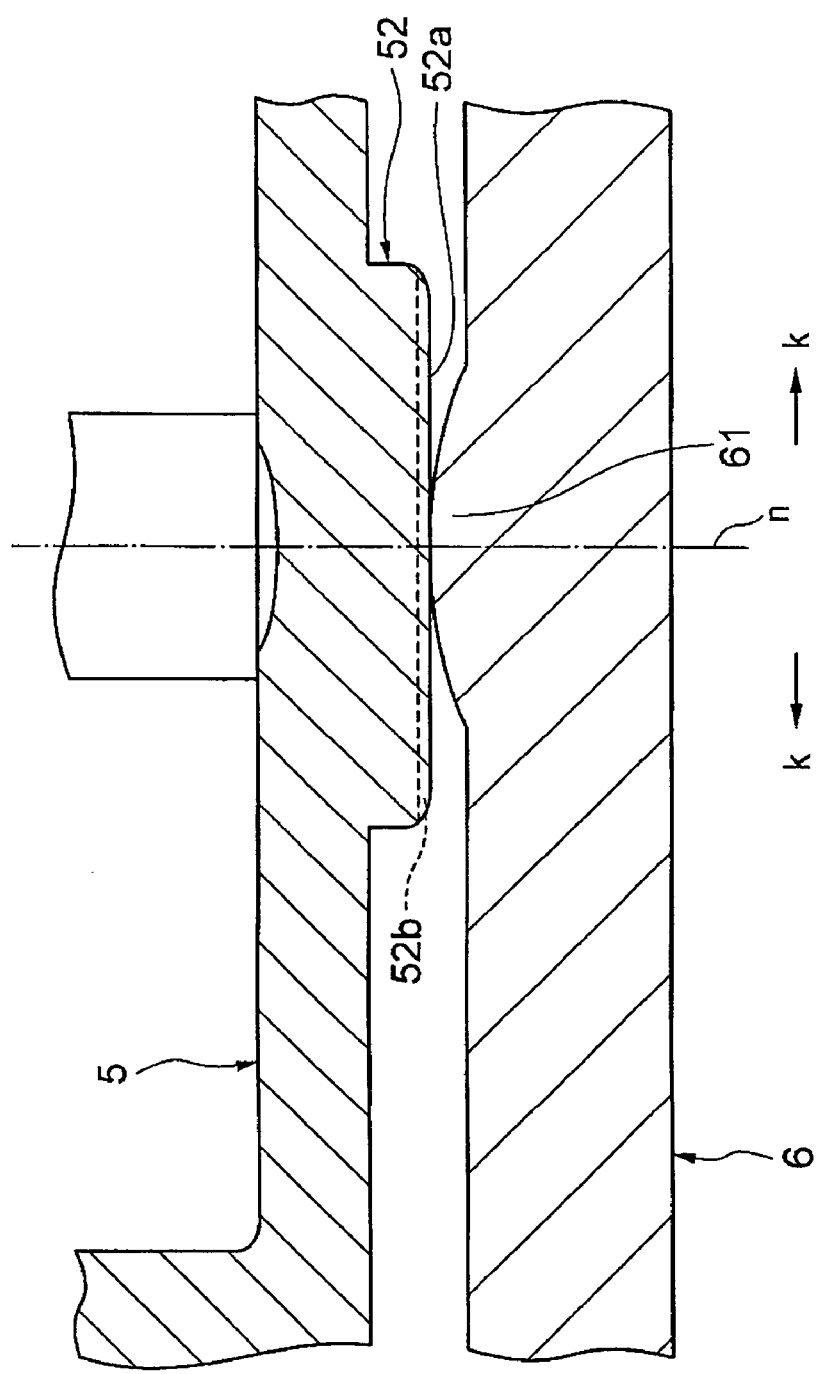
FIG. 4 is a principal vertical sectional view showing a contact portion between a bearing portion of the brake lock member and a butting plate of a brake release member in FIGS. 1 through 3.

Next, the brake release member 6 and the bearing portion 52 of the brake lock member 5 will be explained with reference to FIG. 4. FIG. 4 is a principal vertical sectional view showing a contact portion between the bearing portion of the brake lock member and the brake release member in FIGS. 1 through 3.

As shown in FIG. 4, the brake release member 6 has a protruded portion 61 taking a curved-surface (semi-domed) shape with its rotational central axis n centered on the side of the bearing portion 52. The protruded portion 61 is formed by integral molding when the brake release member 6 is formed from the resinous material.

Further, the brake lock member 5 has a central axis that is substantially coaxial with the rotational central axis n of the brake release member 6 in the bearing portion 52. The bearing portion 52 has a flat surface 52a facing and contacting with the curved-surface-like protruded portion 61.

Figure 5:
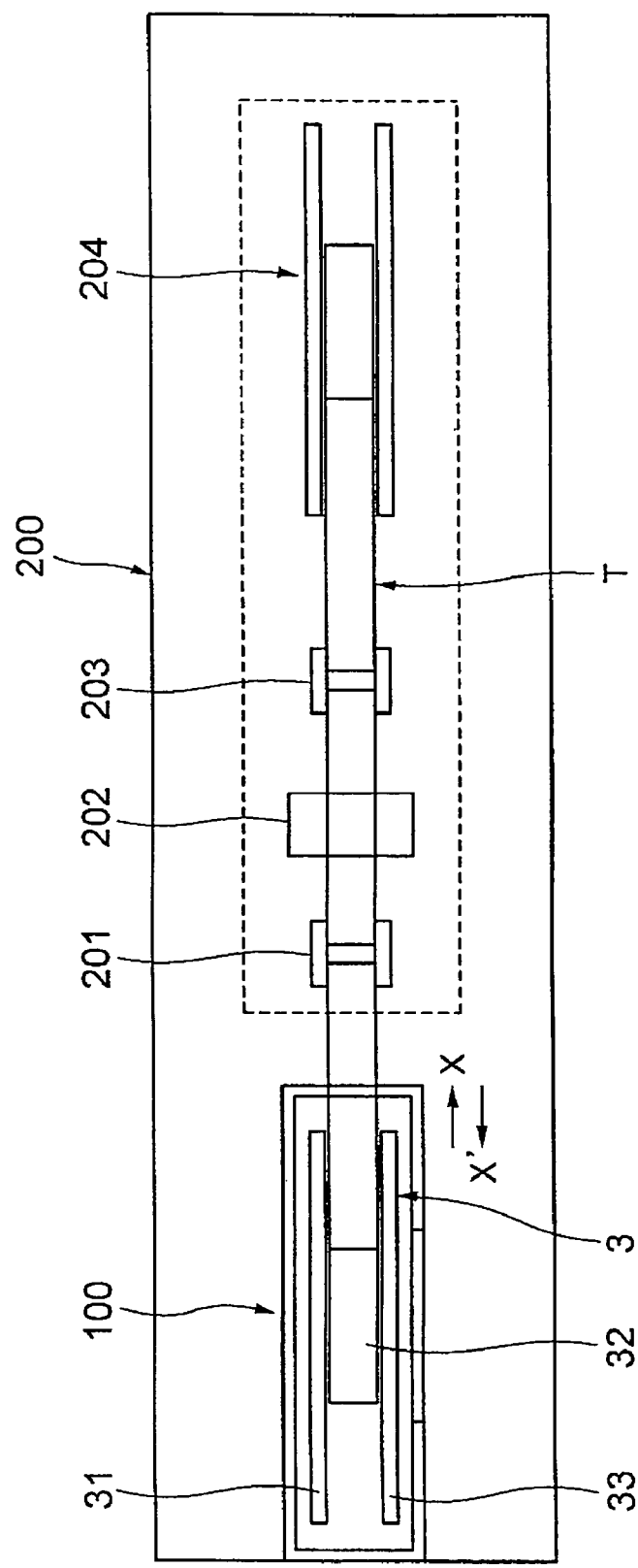
FIG. 5 is a front view conceptually showing a running route of a tape led into a recording/reproducing apparatus from the tape cartridge in the first embodiment or the second embodiment.

Next, a case of loading the tape cartridge into the recording/reproducing apparatus will be described referring further to FIG. 5. FIG. 5 is a front view conceptually showing a running route of the tape led out of the tape cartridge in FIGS. 1 through 3 in the recording/reproducing apparatus.

As shown in FIG. 5, in a drive member 85 on the side of an apparatus 200, a toothed portion 88 engaging with the engagement teeth 34a of the hub 32 is formed along an outer periphery of the drive member 85, and a ring-shaped magnet 87 is embedded into an inner peripheral portion of the toothed portion 88.

As shown in FIG. 5, when the tape cartridge 100 is loaded into the recording/reproducing apparatus 200, the drive member 85 on the side of the apparatus 200 and the tape cartridge 100 relatively approach each other as illustrated in FIG. 3. Then, the drive member 85 passes through the through-hole 21 of the lower case 2, the magnet 87 of the drive member 85 gets close to the metal plate 34 made from the soft magnetic material on the side of the undersurface 32a of the hub 32 and magnetically attracts the metal plate 34, and the toothed portion 88 of the drive member 85 engages with the engagement teeth 34a of the hub 32. Then, the brake release member 6 moves in a direction B' (opposite to the direction B) in FIG. 2 by use of the leg portions 6b with the aid of the protrusions of the toothed portion 88 of the drive member 85. With this movement, the brake lock member 5 moves by a fixed stroke while resisting the biasing force of the brake lock spring 4 and reaches the non-lock position as shown in FIG. 3 with the result that a gap between the toothed portion 51 and the toothed portion 35 is formed, thereby releasing both of the toothed portions 51 and 35 from meshing with each other. As a result, the reel hub unit 3 becomes rotatable with the rotations of a drive shaft 86 of the drive member 85.

Next, the door member 7 is opened by the opening member (unillustrated) on the side of the recording/reproducing apparatus 200, and the leader member 8 is engaged with and held by the holding member (unillustrated) on the side of the apparatus 200. In this state, the magnetic recording table T is led out on the side of the apparatus 200 via the leading aperture 73 by pulling the magnetic recording tape T and is wound along the periphery of the hub of the reel hub unit 204.

Then, the reel hub unit 3 of the tape cartridge 100 and a reel hub unit 204 of the recording/reproducing apparatus 200 are rotationally driven. With this operation, the magnetic recording tape T runs, as shown in FIG. 5, in a horizontal direction X or a horizontal direction X' reversed to the direction X in FIG. 5 while being guided by guides 201, 203 on both sides of a recording/reproducing head 202, whereby the recording/reproducing head 202 effects recording onto or reproducing from the magnetic recording tape T.

Referring to FIG. 4, when recording or reproducing as described above, the curved-surface-like protruded portion 61 of the brake release member 6 contacts with the flat surface 52a of the bearing portion 52 of the brake lock member 5 while the brake release member 6 rotates, however, because of being increased in capacity, even when the reel hub unit 3 rotates at a high rotating speed, in the brake lock member 5 on the non-rotating side, the flat surface 52a of the bearing portion 52 is brought into point-contact with the curved-surface-like protruded portion 61 of the brake release member 6, and hence any tensile force is not applied in a radially outward direction k from the center. Consequently, the brake lock member 5 is stabilized, wherein a shift and a tilt as seen in drifting are hard to occur.

In the manner described above, when employed at the high rotating speed as shown in FIG. 5, or when producing the tape cartridge having the reel hub unit 3 that rewinds the magnetic recording tape T at the high speed, the brake lock member 5 is stabilized with no drifting. It is therefore possible to prevent emission of vibrating noises and occurrence of abrasion in the brake lock member 5 and further prevent abnormal sounds from being emitted and the teeth from being chipped away as hitherto occurred.

Figure 6:
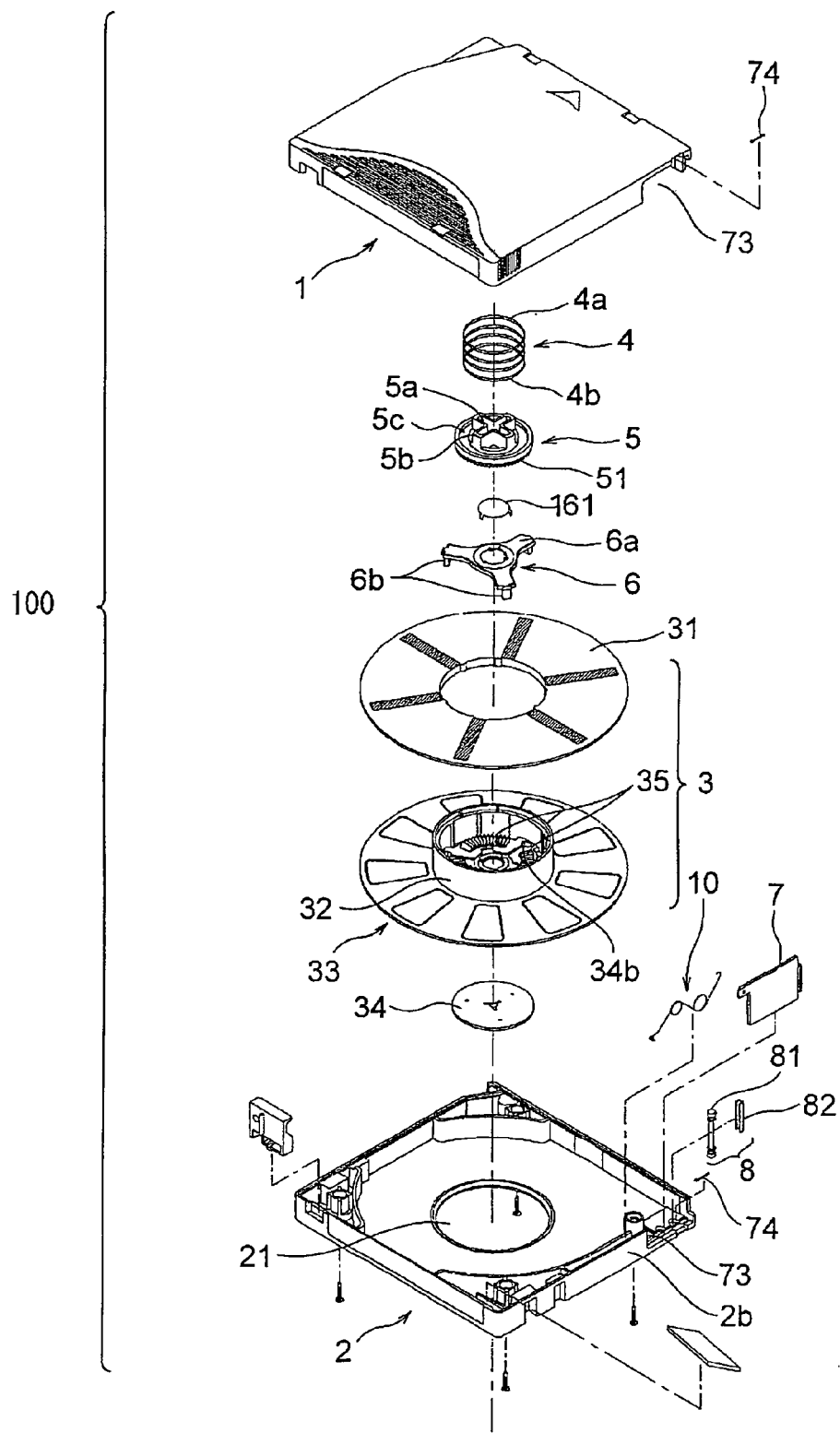
FIG. 6 is an exploded perspective view of the tape cartridge in the second embodiment.

The configuration in the first embodiment is that when used, the curved-surface-like protruded portion 61 of the brake release member 6 rotating together with the reel hub unit 3 contacts with the flat surface 52a of the bearing 52 of the non-rotating brake lock member 5, and the relationship opposite to the conventional case is established as shown in FIG. 6, thereby making it possible to effectively prevent the emission of the vibrating noises, the occurrence of the abrasion and further prevent the abnormal sounds from being emitted and the teeth from being chipped away.

Second Embodiment

Figure 7:
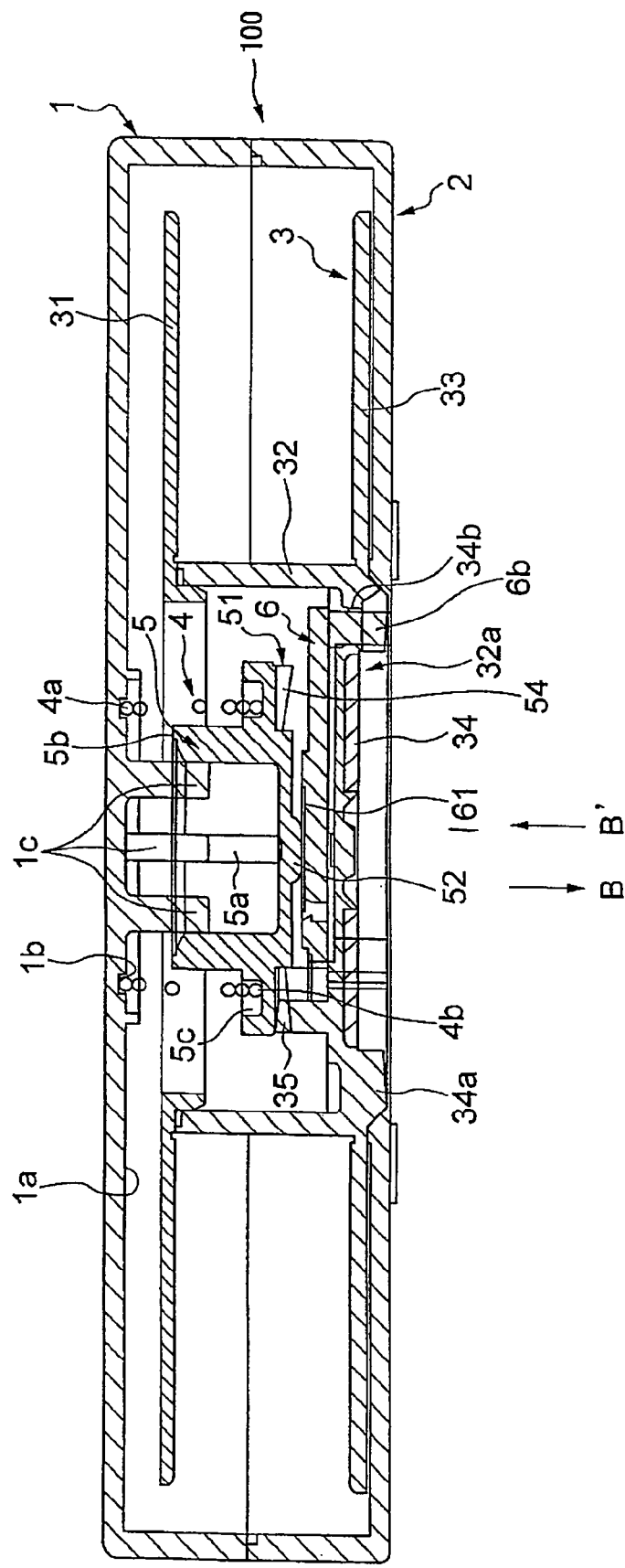
FIG. 7 is a vertical sectional view of the tape cartridge in FIG. 6, showing a state where the reel hub unit is locked in the lock position.
Figure 8:
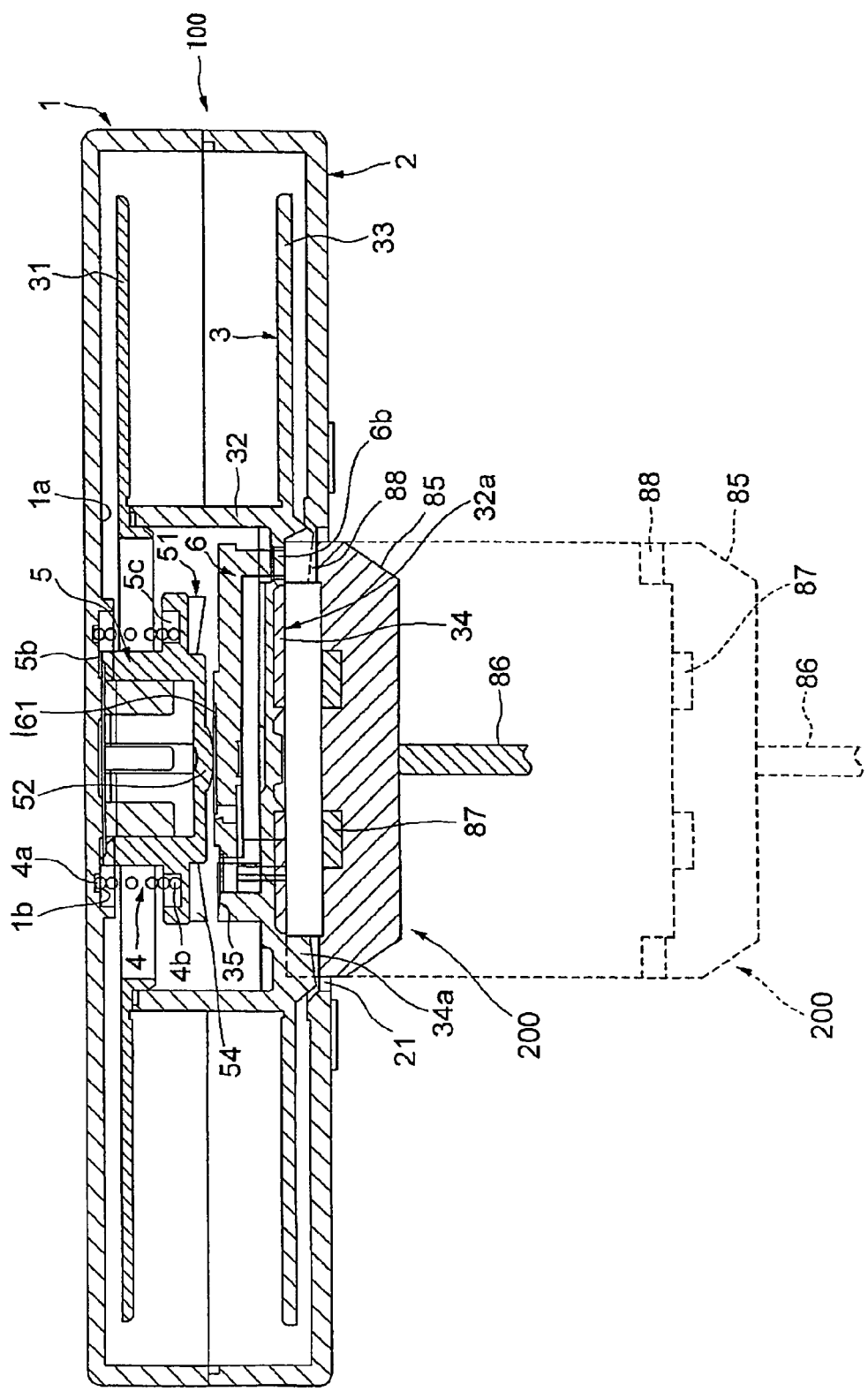
FIG. 8 is similarly a vertical sectional view of the tape cartridge in the second embodiment in FIG. 6, showing a state where the reel hub unit is unlocked in the non-lock position.

FIG. 6 is an exploded perspective view of the tape cartridge in a second embodiment. FIG. 7 is a vertical sectional view showing a state where the reel hub unit is locked in the tape cartridge in FIG. 6. FIG. 8 is similarly a vertical sectional view showing a state where the reel hub unit is unlocked.

As illustrated in FIGS. 6 through 8, the tape cartridge in the second embodiment has substantially the same configuration as FIGS. 2 and 3 show, except a construction of the bearing portion 52 of the brake lock member 5 and a construction of the brake release member 6 contacting with the bearing portion 52, and hence the explanations of the same components are omitted.

Figure 9:
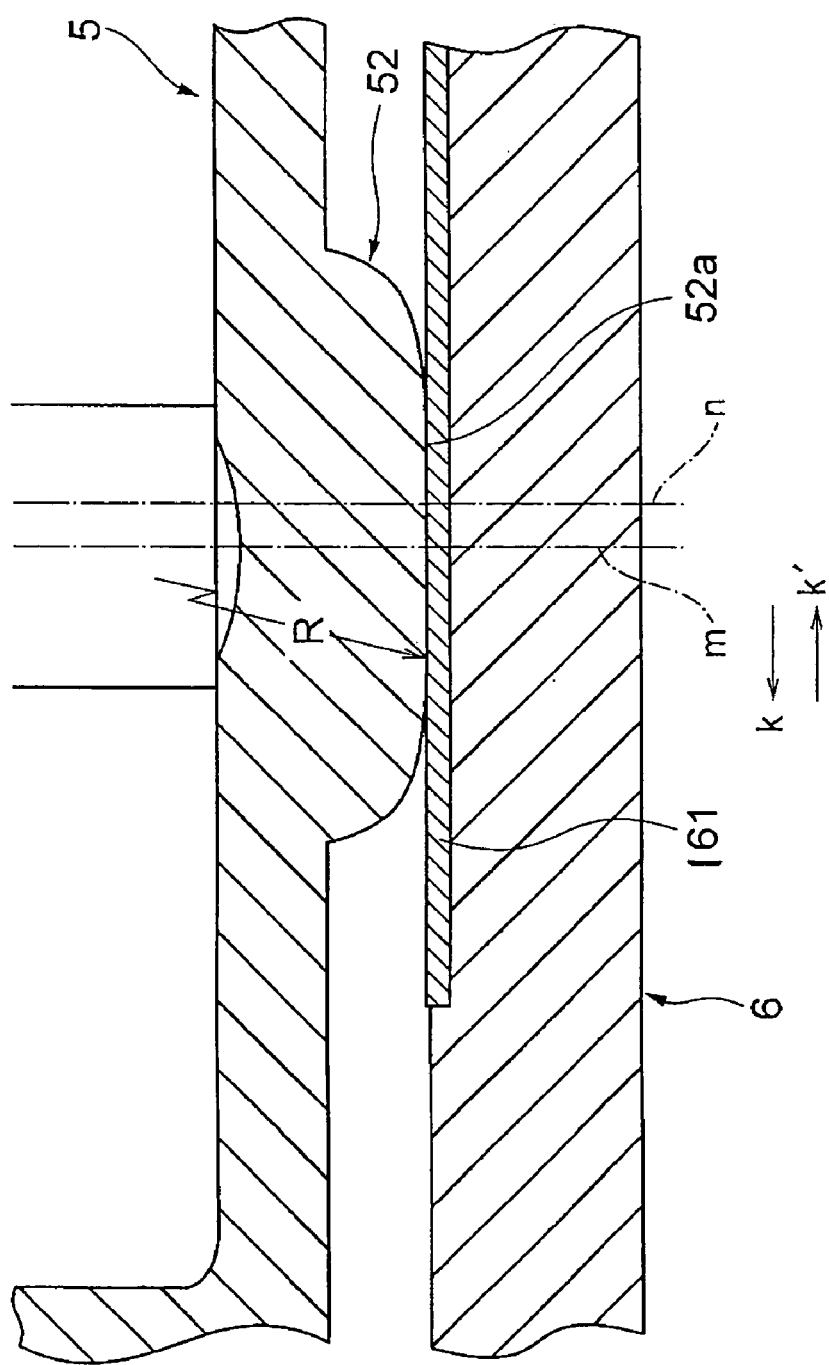
FIG. 9 is a principal vertical sectional view showing a contact portion between the bearing portion of the brake lock member and a butting plate of the brake release member in FIGS. 6 to 8.
Figure 10:
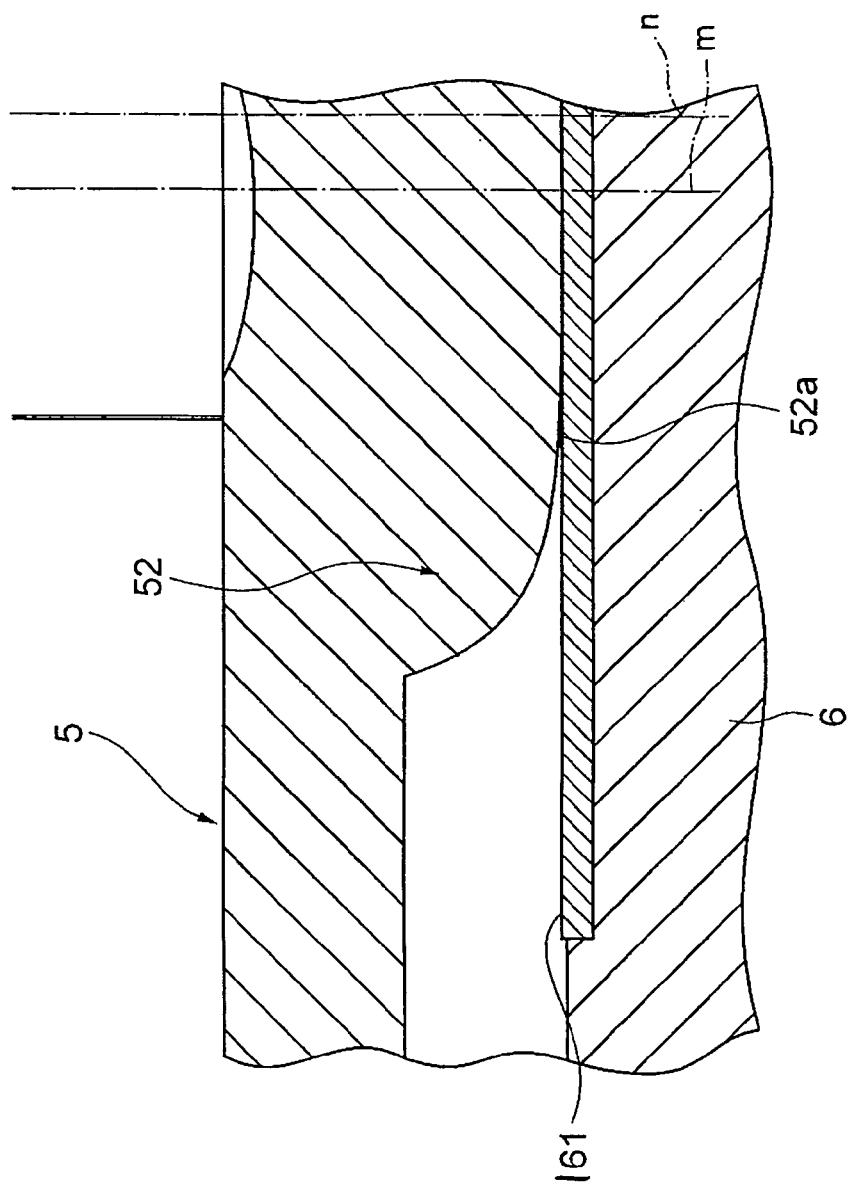
FIG. 10 is a principal vertical sectional view showing the components in further enlargement of FIG. 9.
Figure 11A:
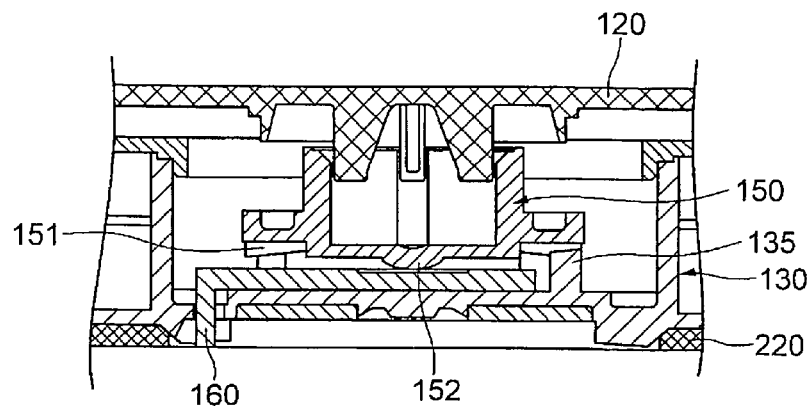
FIGS. 11A through 11C are views showing a conventional 1-reel type tape cartridge.
Figure 11B:
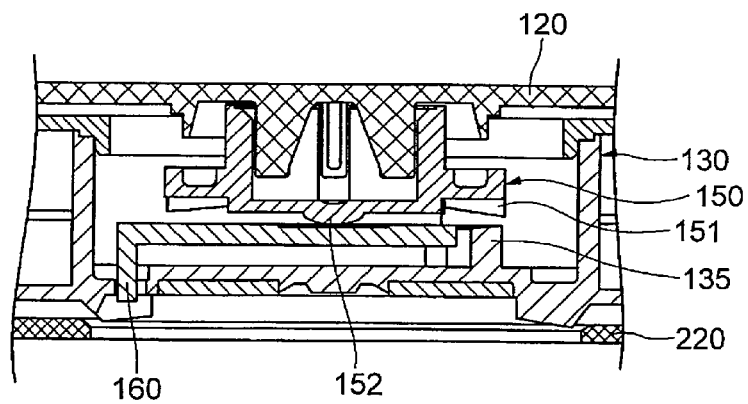
Figure 11C:
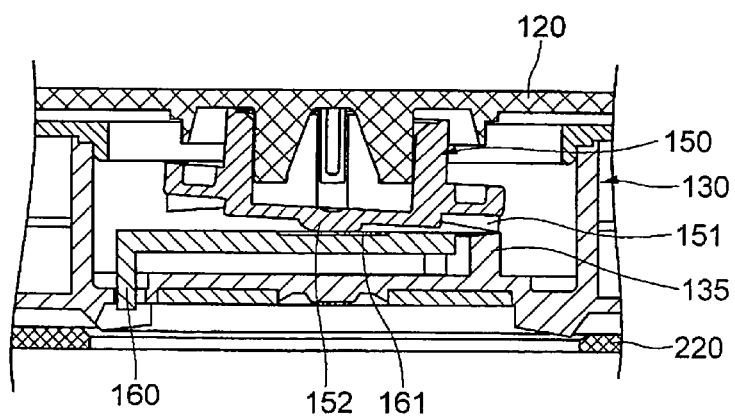

The bearing portion 52 of the brake lock member 5 in FIGS. 7 and 8 will be explained with reference to FIGS. 9 and 10. FIG. 9 is a principal vertical sectional view showing a contact portion between the bearing portion of the brake lock member and a butting plate of the brake release member in FIGS. 6 to 8. FIG. 10 is a principal vertical sectional view showing the components in further enlargement of FIG. 9.

The brake lock member 5 shown in FIGS. 7 and 8 is formed in axial symmetry with respect to a central axis m in FIG. 9, and, as shown in FIG. 9, the protruded bearing portion 52 has a curved surface coaxial with the central axis m and includes a curved surface portion 52a contacting with the butting plate 161 of the brake release member 6.

The butting plate 161 of the brake release member 6 takes a flat-surface shape and moves to the non-lock position so that the brake lock member 5 is, as shown in FIG. 8, raised upward resisting the biasing force of the brake lock spring 4 at the central protruded bearing portion 52 through the butting plate 161, and the edge portion 5b approaches the internal face 1a.

As shown in FIG. 9, the brake lock member 5 is disposed with deviation (offset) so that the central axis m is substantially parallel with the rotating central axis n when the brake release member 6 rotates together with the reel hub unit 3. This deviation (offset) quantity (n−m) is preferably 0.1 mm through 1.5 mm and more preferably 0.2 mm through 1.5 mm.

Note that the deviation (offset) quantity between the central axis m and the rotating central axis n can be set by providing the plurality of engagement protrusions 1c (FIG. 7) erecting from the internal surface 1a of the upper case 1 in a way that shifts positions of these protrusions 1c to predetermined positions.

Next, a case where the tape cartridge in FIG. 6 is loaded into the recording/reproducing apparatus will be described by referring further to FIG. 5. FIG. 5 is a front view conceptually showing a running route of the tape led out of the tape cartridge in FIGS. 6 to 8 in the recording/reproducing apparatus.

An apparatus 200 shown in FIG. 5 has the drive member 85 shown in FIG. 8, the toothed portion 88 engaging with the engagement teeth 34a of the hub 32 is formed along the outer periphery of the drive member 85, and the ring-shaped magnet 87 is embedded into the inner peripheral portion of the toothed portion 88.

As shown in FIG. 5, when the tape cartridge 100 is loaded into the recording/reproducing apparatus 200, the drive member 85 on the side of the apparatus 200 and the tape cartridge 100 relatively approach each other as illustrated in FIG. 8. Then, the drive member 85 passes through the through-hole 21 of the lower case 2, the magnet 87 of the drive member 85 gets close to the metal plate 34 made from the soft magnetic material on the side of the undersurface 32a of the hub 32 and magnetically attracts the metal plate 34, and the toothed portion 88 of the drive member 85 engages with the engagement teeth 34a of the hub 32. Then, the brake release member 6 moves in a direction B' (opposite to the direction B) in FIG. 7 by use of the leg portions 6b with the aid of the protrusions of the toothed portion 88 of the drive member 85. With this movement, the brake lock member 5 moves by a fixed stroke while resisting the biasing force of the brake lock spring 4 and reaches the non-lock position as shown in FIG. 8 with the result that a gap between the toothed portion 51 and the toothed portion 35 is formed, thereby releasing both of the toothed portions 51 and 35 from meshing with each other. As a result, the reel hub unit 3 becomes rotatable with the rotations of the drive shaft 86 of the drive member 85.

Next, the door member 7 is opened by the opening member (unillustrated) on the side of the recording/reproducing apparatus 200, and the leader member 8 is engaged with and held by the holding member (unillustrated) on the side of the apparatus 200. In this state, the magnetic recording table T is led out on the side of the apparatus 200 via the leading aperture 73 by pulling the magnetic recording tape T and is wound along the periphery of the hub of the reel hub unit 204.

Then, the reel hub unit 3 of the tape cartridge 100 and the reel hub unit 204 of the recording/reproducing apparatus 200 are rotationally driven. With this operation, the magnetic recording tape T runs, as shown in FIG. 5, in the horizontal direction X or the horizontal direction X' reversed to the direction X in FIG. 5 while being guided by the guides 201, 203 on both sides of the recording/reproducing head 202, whereby the recording/reproducing head 202 effects recording onto or reproducing from the magnetic recording tape T.

To give an explanation with reference to FIGS. 9 and 10, when recording or reproducing as described above, the butting plate 161 of the brake release member 6 contacts with the protruded bearing 52 of the brake lock member 5 while the brake release member 6 rotates, however, because of being increased in capacity, when the reel hub unit 3 rotates at the high rotating speed, in the brake lock member 5 on the non-rotating side, the central axis m of the bearing portion 52 deviates from the rotating central axis n of the brake release member 6 on the rotational side, whereby a force acting to move in an outward direction k (FIG. 9) from the central axis m is applied on one hand while the biasing force of the brake lock spring 4 generates a force acting to return in an inward direction k' (FIG. 9). Consequently, both of these forces are in balance, thereby stabilizing the brake lock member 5, wherein the shift and the tilt are hard to occur.

To be specific, if the deviation (offset) quantity (n−m) of the central axis m of the bearing portion 52 from the rotating central axis n of the brake release member 6 is equal to or larger than 1 mm and preferably equal to or larger than 0.2 mm, it is possible to surely prevent emission of the vibrating sounds such as chattering sounds, etc. Moreover, if the deviation quantity is equal to or smaller than 1.5 mm, the abrasion gets hard to occur in the curved-surface portion 52a of the bearing portion 52 and in the butting plate 161 even when a peripheral speed increases due to the high rotating speed.

To give the description with reference to FIGS. 7, 9 and 10, it is feasible to restrain a tilt of the brake lock member 5 due to a built-in clearance between the upper case 1 and the brake lock member 5 by increasing a radius R of the curved-surface portion 52a of the bearing portion 52, whereby the contact between each tooth 54 and the toothed portion 35 can be prevented. If the radius R is equal to or larger than 30 mm, however, the abrasion gets easy to occur. Accordingly, the tilt of the brake lock member 5 can be restrained by setting the radius R within a range of 10 mm to 30 mm, and the contact between the respective teeth 54 and the toothed portion 35 can be prevented. Then, the abrasion does not occur.

Hence, when used at the high rotating speed, or when producing the tape cartridge in which the magnetic recording tape T is rewound on the reel hub unit 3, there is neither the emission of the abnormal sounds nor the occurrence of chipping as hitherto seen.

EXAMPLES

Next, the second embodiment will be explained more specifically by way of examples. As in Table 1 that follows, the 1-reel type tape cartridge, as shown in FIG. 6, having a tape width of 12.65 mm is manufactured in a way that changes the offset quantity (n−m) to 0.1 mm, 0.2 mm, 0.3 mm, 0.5 mm, 1.0 mm and 1.5 mm by way of examples 1 through 6. Further, the radius R of the curved-surface portion 52a of the brake lock member 5 is changed such as 8 mm, 10 mm, 15 mm, 25 mm, 30 mm and 35 mm. Moreover, the same tape cartridge having none of the offset quantity is manufactured by way of a comparative example 1. Still further, the same tape cartridge having the offset quantity of 2 mm is manufactured by way of a comparative example 2. Yet further, the offset quantity is set to 0 mm through 1.5 mm, and the radius R of the curved-surface portion 52a of the brake lock member 5 is changed to 35 mm by way of a comparative example 3.

TABLE 1

|  |  | Comparative Example 1 | Examples 1 to 6 | | | | | | Comparative Example 2 |
|---|---|---|---|---|---|---|---|---|---|
|  |  | Offset Quantity (mm) | | | | | | | |
|  |  | No Offset | 0.1 | 0.2 | 0.3 | 0.5 | 1 | 1.5 | 2 |
| R (mm) | 8 | (2) (3) | (2) | (2) (3) | (2) (3) | (2) (3) | (2) (3) | (2) (3) | (2) (3) |
|  | 10 | (2) (3) | ○ | ○ | ○ | ○ | ○ | ○ | (2) (3) |
|  | 15 | ○ | ○ | ○ | ○ | ○ | ○ | ○ | (3) Δ |
|  | 25 | (1) | ○ | ○ | ○ | ○ | ○ | ○ | (3) Δ |
|  | 30 | (1) | ○ | ○ | ○ | ○ | ○ | ○ | (3) Δ |
|  | 35 | (1) | (1) Δ | (1) Δ | (3) Δ | (3) Δ | (3) Δ | (3) | (3) |
|  |  | | Comparative Example 3 | | | | | | |

The following items are observed in a way that rotates the tape cartridge in each of the examples 1 through 6 and in the comparative examples 1, 2 and 6 at a comparatively high and fixed rotating speed, and a result of this observation is shown in Table 1. In Table 1, a mark ○ (circle) represents a preferable result in all the items (1) through (3), a mark Δ (triangle) represents a result that can not be said to be preferable but is no problem in terms of actual use, and the examples shown by (1) to (3) represent nothing preferable in their items.

(1) Frequency of emission of vibrating sounds
(2) Frequency of emission of abnormal sounds caused when the teeth butts against each other
(3) Abrasion state on slide surface of curved-surface portion The result in Table 1 is that all the items (1) through (3) exhibit the preferable results in all the cases by setting the offset quantity to 0.1 mm through 1.5 mm and setting the radius R of the curved-surface portion to 10 mm through 30 mm. On the other hand, in the comparative example 1 with no offset, when the radius R of the curved-surface portion is large, the result is that the frequency of emission of the vibrating sounds rises. In the comparative example 2 with the offset quantity that is 2 mm, the result is that as the radius R of the curved-surface portion becomes large, the abrasion quantity on the slide surface of the curved-surface portion increases. Further, in the comparative example 3, when the radius R of the curved-surface portion becomes as large as 35 mm, the frequency of emission of the vibrating sounds rises if the offset quantity is small, and the abrasion quantity on the slide surface of the curved-surface portion increases as the offset quantity becomes large.

The present invention has been discussed so far by way of the embodiments and the examples but is not limited to these embodiments and examples and can be modified in a variety of forms within the scope of the technical ideas of the present invention. For example, as indicated by the broken line in FIG. 4, a sheet member 52*b* made from, for instance, a metal material is attached to the bearing portion 52 of the brake lock member 5 and thus contacts with the curved-surface-like protruded portion 61 of the brake release member 6, thereby making it possible to prevent the abrasion of the bearing portion 52 of the brake lock member 5. Moreover, though not illustrated, the sheet member may also be provided on the side of the protruded portion 61 of the brake release member 6.

Further, the central bearing portion of the brake lock member 5 is illustrated as the flat surface portion having the protruded surface facing the brake release member 6 in FIG. 4. However, the bearing portion 52 can be, as a matter of course, configured as the flat surface portion that is flush throughout the surface, of the brake lock member 5, facing the brake release member 6 without any protrusion other than the toothed portion 51 by giving predetermined dimensions.

Moreover, in FIG. 4, the protruded portion 61 of the brake release member 6 is configured in the curved-surface shape (the semi-domed shape), however, the present invention is not limited to this shape and may take a circular conic shape. In this case, the apex of the cone may be rounded.

What is claimed is:

1. A tape cartridge comprising:
 a single reel hub unit rotatably accommodated in a case and having its periphery wound with a tape-shaped recording medium;
 a brake lock member including an engaging portion engaging with an engaged portion of said reel hub unit to restrict a rotation of said reel hub unit when in non-use, and a protruded bearing portion provided substantially at a central part thereof;
 a brake release member for moving said brake lock member so as to release said engaging portion of said brake lock member from the engagement with said engaged portion of said reel hub unit when in use; and
 a biasing member for biasing said brake lock member so that said protruded bearing portion of said brake lock member contacts with a contact surface of said brake release member,
 wherein said brake lock member is provided so that a central axis of said bearing portion of said brake lock member is parallel with and offset from a rotating central axis around which said brake release member rotates together with said reel hub unit.

2. A tape cartridge according to claim 1, wherein the offset quantity of the central axis of said bearing portion of said brake lock member from the rotating axis of said brake release member is set to 0.1 mm through 1.5 mm.

3. A tape cartridge according to claim 1, wherein said protruded bearing portion has a curved surface portion provided about the central axis and contacting with said contact surface, and a radius of said curved-surface portion is set within the range of 10 mm through 30 mm.

* * * * *